United States Patent [19]
Shima et al.

[11] 4,000,102
[45] Dec. 28, 1976

[54] PROCESS FOR THE MANUFACTURE OF ANTISTATIC AND BIAXIALLY ORIENTED POLYPROPYLENE FILM

[75] Inventors: Keizo Shima, Suita; Seizi Iwamiya; Hirosi Yano, both of Amagasaki, all of Japan

[73] Assignee: Daicel, Ltd., Osaka, Japan

[22] Filed: Dec. 11, 1974

[21] Appl. No.: 531,625

[30] Foreign Application Priority Data

Dec. 15, 1973  Japan ............................ 48-140844

[52] U.S. Cl. .............................. 260/23 H; 264/22; 264/80; 264/211; 526/6
[51] Int. Cl.$^2$ ................... B29D 7/24; C08L 23/12; C08L 91/00; H05B 7/16
[58] Field of Search .......... 264/22, 80, 211, 210 R, 264/289; 260/23 H

[56] References Cited
UNITED STATES PATENTS

| | | | |
|---|---|---|---|
| 3,333,032 | 7/1967 | Dickinson | 264/22 |
| 3,657,114 | 4/1972 | Smith | 260/23 H |
| 3,773,609 | 11/1973 | Haruta et al. | 264/289 |
| 3,790,517 | 2/1974 | Koizumi | 260/23 H |
| 3,803,065 | 4/1974 | Arai et al. | 260/23 H |

*Primary Examiner*—Jan H. Silbaugh
*Assistant Examiner*—James B. Lowe
*Attorney, Agent, or Firm*—Woodhams, Blanchard and Flynn

[57] ABSTRACT

An antistatic and biaxially oriented polypropylene film is manufactured by the steps of (1) adding to crystalline polypropylene, (a) an antistatic agent and (b) a zinc salt of aliphatic acid, (2) melt-extruding the resulting composition to form a sheet or film, (3) orienting the sheet or film both longitudinally and laterally at a temperature below its melting point, and then (4) activating the surface of the resultant antistatic and biaxially oriented film. The film thus obtained possesses a remarkably improved antistatic property and adhesiveness to ink printed on it and to resins coated on it.

7 Claims, No Drawings

PROCESS FOR THE MANUFACTURE OF ANTISTATIC AND BIAXIALLY ORIENTED POLYPROPYLENE FILM

BACKGROUND OF THE INVENTION

1. Field of the Invention

This invention relates to a process for the manufacture of an antistatic and biaxially oriented polypropylene film which is greatly improved in its antistatic property and in its adhesiveness to ink printed on it and to resins coated on it.

2. Description of the Prior Art

Conventional biaxially oriented polypropylene film possesses excellent optical, electric, and mechanical properties, as well as gas- and water-proofness properties. Such films are widely used, for example, as wrapping and insulating materials, and the like. A disadvantage, however, of such a film is that it tends to generate and accumulate static electric charges so that it emits sparks and gives shocks to workers who handle it. Because of these properties, the processability and printability of the film is reduced and/or dust and dirt stick on its surface, and as a result, the commercial value of the film is reduced.

There are two known methods to avoid such disadvantages. One is to coat an antistatic agent on the surface of the film and the other is to blend an antistatic agent together with the polypropylene resin in the course of making the film. The former method cannot provide a long-lasting effective antistatic property. On the other hand, the latter method is characterized by the fact that the antistatic agent oozes from the inside of the film onto its surface, or blooms, to give the film an antistatic property which remains effective for a long time. In this respect, the latter method is far superior to the former.

When, however, the molecular chains of the polypropylene resin are highly crystalline, the molecular chains in the resulting film accordingly become highly oriented. When this kind of polypropylene resin is used, the latter antistatic treatment method is ineffective to confer a sufficient antistatic effect on the film because the crystalline and oriented molecular structure prevents the antistatic agent from oozing from the inside of the film onto its surface. Therefore, to provide an effective antistatic property, the film must be subjected to a surface-treatment such as a corona discharge treatment, to enhance the migration of the antistatic agent onto its surface.

Further, it is desired to print inks or coat resins onto the surface of biaxially oriented film manufactured of polypropylene resin having highly crystalline molecular chains. During such applications of inks and resins, inherently, static electricity is apt to be generated on the surface of the film and the solvent used in the ink or the resin is apt to ignite. Thus, a film intended for this use is required to have an antistatic property. For this purpose, it is customary to blend an antistatic agent with the polypropylene resin and to subject the film to corona discharge. The difficulty that occurs, however, with biaxially oriented polypropylene film containing an antistatic agent that has been treated by corona discharge, is that the antistatic agent oozes out all over the film surface, thereby creating a condition which adversely affects the adhesiveness of inks and resins to the film surface. Thus, the polypropylene film, when subjected to corona discharge, possesses an increased antistatic property, but its adhesiveness is decreased.

SUMMARY OF THE INVENTION

According to the invention, there is provided a process for manufacturing an improved antistatic and biaxially oriented polypropylene film, as follows:

To crystalline polypropylene there are added (1) an antistatic agent and (2) 0.2 to 3 percent by weight of a zinc salt of an aliphatic acid. The resulting mixture is blended and melt extruded to form a sheet or film, which then is biaxially oriented at a temperature below its melting point by stretching in the longitudinal and lateral directions and then the oriented film is activated on its surface. The obtained film is an antistatic and biaxially oriented polypropylene film which possesses unexpectedly high adhesiveness to inks and resins and a high and long-lasting antistatic property.

The crystalline polypropylene resin used in this invention is a solid polymer in its ordinary state, it has an insolubility of over 80 wt. percent when placed into boiling n-heptane, and it has an intrinsic viscosity of 1.3 to 4.2. It consists of 90 to 100 wt. percent of propylene monomer units. It can contain up to 10 wt. percent of units of other monomers copolymerizable with propylene. For example, there can be used a copolymer containing 10 percent or less by weight of ethylene monomer units and the balance is propylene monomer untis.

The polypropylene polymers can contain blended therein conventional adjunct materials, such as stabilizers and/or fillers, used in the manufacture of the polypropylene films, in accordance with conventional practice.

The antistatic agents suitable for use in the invention are anionic, cationic, amphoteric, and nonionic substances. Particulary, nonionic antistatic agents, such as polyoxyethylene alkylamides and polyoxyethylene alkylamines, are suitable for conferring the antistatic property on the polypropylene film. The amount used of the antistatic agent should be in the range of 0.5 to 5 wt. percent, especially from 1 to and conditions wt. percent, based on the weight of the polypropylene polymer. The preferred amount of antistatic agent, or mixture of antistatic agents, added to polypropylene resin and used to form a film, according to the invention, cannot be strictly defined because the amount used depends on such factors as, the specific kind of antistatic agent used, the amount of zinc salt of aliphatic acid blended in the polymer, and the conditions of film manufacture, for example, the extrusion temperature, the extent to which the film is biaxially oriented, and like factors. However, by routine experimentation the preferred composition conditions conditons of film maufacture can be determined so as to produce an antistatic, biaxially oriented film suitable for the desired purpose.

The zinc salt of an aliphatic acid acts effectively, in assisting the printing ink to adhere to the surface of the film formed by the process of the invention. The zinc salt also works efficiently in aiding a resin to adhere to the surface of the polypropylene film when the resin to be coated on the film is made of a polymer or copolymer essentially consisting of vinyl monomers which contain a carboxyl or ester group. This superior adhesive effect is unique to the zinc salts of aliphatic acids, and it cannot be obtained by using other metallic salts of aliphatic acids, such as calcium, magnesium, barium, lead, lithium, aluminum, and sodium salts.

The formula of the zinc salt of an aliphatic acid employed in this invention is as follows:

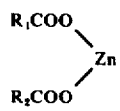

wherein $R_1$ and $R_2$, which can be the same or different, are aliphatic hydrocarbon radicals having a chain length of $C_{12}$ to $C_{22}$, preferably alkyl of $C_{12}$ to $C_{22}$, or olefinically unsaturated aliphatic hydrocarbons, such as alkenyl, of $C_{12}$ to $C_{22}$.

The activation treatment by flame, corona discharge, and other known surface activation techniques for olefin polymers is designed to produce polar groups on the surface of the film. It is important that the activation treatment must be conducted with some minimum effective force. For example, the corna discharge treatment should be made with a current of at least 0.02 ampere/square meter/minute and should be in the range of 0.02 to 0.05 ampere/square meter/minute; otherwise the film surface is not sufficiently activated.

This invention is illustrated by, but is not restriced to, the following examples. The Scotch-tape test and the antistatic property test referred to in the examples are performed as follows:

1. Scotch-Tape Test:

A piece of pressure-sensitive adhesive cellophane tape is pressed onto the film surface which has been printed with ink or coated with resin, and then the tape is abruptly pulled off at a peeling angle of 180 degress. The adhesiveness of the film is judged by the following criteria:

| Rating | Adhesive Property | Observed Results |
|---|---|---|
| 1 | Extremely Inferior | 100% of the ink or resin initially on the film surface sticks to the tape |
| 2 | Inferior | 70% of the ink or resin initially on the film surface sticks to the tape |
| 3 | Slightly Inferior | 40% of the ink or resin initially on the film surface sticks to the tape |
| 4 | Good | 20% of the ink or resin initially on the film surface sticks to the tape |
| 5 | Excellent | None of the ink or resin initially on the film surface sticks to the tape |

2. Antistatic Property Test:

A film which has undergone the surface-activating treatment is placed at 15 mm from a driver electrode and also at a distance of 10 mm from a probe. A 10 KV DC voltage is applied from the driver electrode onto the film surface for 30 minutes. Thereafter, the change of the voltage on the film surface that occurs, with the passage of time, beginning at the time when the external voltage supply is stopped, is measured by an electrometer. The half-life period of the voltage is determined in order to evaluate the antistatic property of the film. The shorter the half-life period, the better is the antistatic property of the film.

GROUP I

Comparative Examples 1, 2, 3, 4, 5 and 6 and Examples 4A, 4B, 6A, 6B, 6C and 6D:

There was used, as the resin, polypropylene having the properties that 96 percent by weight of it remains as a solid residue when it is extracted with n-heptane, and its melt index is 2.0. To samples of that polypropylene were added various amounts of (1) an antistatic agent consisting of one mole of stearyl amine reacted with 6 moles of ethylene oxide, and (2) zinc stearate. The amounts used of the antistatic agent and the zinc stearate are indicated in Tables 1 and 2. Each mixture was kneaded by a Banbury mixer. The resulting isotactic polypropylene resin was extruded, at 250° C., to form an unoriented film of 800 microns in thickness, employing a 40 mm extruder equipped with a T-die.

The film was oriented by stretching it longitudinally to five times its original length at 140° C., and then, with its both sides held by clips, it was further stretched laterally in a heating chamber, employing hot air circulating at 160° C., to seven times its original width. Thereafter, the film was firmly held and was heated at 165° C. for one minute, and then was wound on a roll. Then, this biaxially oriented polypropylene film was subjected to corona discharge treatment, the intensity of which ranged from 0.01 to 0.05 ampere/square meter/minute.

The foregoing film was allowed to stand for 4 days in an atmosphere of 65 percent relative humidity at 20° C., and then was coated, by a No. 5 Meyer Bar, on its surface with a solution of 3 wt. percent of polymethacrylate resin in methylethylketone. The film was then dried in a hot-air circulating oven for one minute at 100° C. to produce a coated film. The polymethacrylate used as a solute was such that a 35 wt. percent solution of the polymethacrylate in methylethylketone at 25° C. had a viscosity of 1200 cps. The test results are shown in Tables 1 and 2.

Table 1

|  | Sample No. | Intensity of Corona Discharge Treatment (ampere/m²/min.) | Concentration of antistatic agent (wt. %) | Half-Life of Residual Static Electric Charge (sec)* | Scotch-Tape Test (rating) |
|---|---|---|---|---|---|
| Comparative Examples | 1 | 0.01 | 0 | — | 1 |
|  | 2 | 0.01 | 1.6 | 300 | 1 |
|  | 3 | 0.02 | 0 | — | 5 |
|  | 4 | 0.02 | 1.6 | 25 | 1 |
|  | 5 | 0.035 | 0 | — | 5 |
|  | 6 | 0.035 | 1.6 | 10 | 1 |

*Indicates an antistatic property test.

Table 1 shows the effect of the antistatic agent, (one mole of stearyl amine reacted with 6 moles of ethylene oxide) and the effect of varying the intensity of the corona discharge treatment, on the adhesiveness between the surface of the film and the polymethacrylate coating.

The corona treatment at 0.01 ampere/square meter/minute, as shown in the Comparative Examples 1 and 2 (Table 1), is so weak in intensity that the treatment gives no adhesive effect, whether or not there is an antistatic agent in the film. On the other hand, the corona treatment at 0.02 and 0.035 ampere/-square meter/minute, as indicated in the Comparative Examples 3, 4, 5 and 6 (Table 1), activates the surface of the film so markedly as to produce an adhesive effect when there is no antistatic agent in the film. In other words, these examples show that an antistatic agent which migrates to the surface of the film inhibits a firm adherence between the film surface and the coated layer.

charge treatment of higher intensity, without reducing adhesiveness, as Examples 4A, 6A and 6B show clearly.

GROUP II

Examples 7 and 8:

To the same propylene resin used in the Group I experiments, were added (1) an antistatic agent consisting of one mole of stearyl amide reacted with 2 moles of ethylene oxide and (2) zinc stearate in the amounts shown in Table 3.

The mixture was blended by a Banbury mixer to give an isotactic polypropylene resin, which then was processed by the same method as shown in Example 4A to form an antistatic and biaxially oriented polypropylene film.

The film was coated on its surface, after being subjected to corona discharge, with a toluene solution containing 3 wt. percent of a copolymer composed of stearyl methacrylate and methacrylic acid at the molar Table 2

|  | Sample No. | Intensity of Corona Discharge Treatment (ampere/$m^2$/min) | Concentration of antistatic agent (wt. %) | Concentration of Zinc Stearate (wt. %) | Half-Life of Residual Static Electric Charge (sec)* | Scotch-Tape Test (rating) |
|---|---|---|---|---|---|---|
| Comp. Ex. | 2 (Table 1) | 0.01 | 1.6 | 0 | 300 | 1 |
| Examples | 2A | 0.01 | 1.6 | 0.4 | 360 | 1 |
|  | 2B | 0.01 | 1.6 | 1.5 | 380 | 2 |
| Comp. Ex. | 4 (Table 1) | 0.02 | 1.6 | 0 | 25 | 1 |
| Examples | 4A | 0.02 | 1.6 | 0.4 | 70 | 4 |
|  | 4B | 0.02 | 1.6 | 1.0 | 135 | 5 |
| Comp. Ex. | 6 (Table 1) | 0.035 | 1.6 | 0 | 10 | 1 |
| Examples | 6A | 0.035 | 1.6 | 0.4 | 13 | 4 |
|  | 6B | 0.035 | 1.6 | 1.0 | 85 | 5 |
|  | 6C | 0.035 | 1.6 | 1.5 | 150 | 5 |
|  | 6D | 0.035 | 1.6 | 2 | 240 | 5 |

*Indicates an antistatic property test.

Table 2 shows the effect of adding zinc stearate to the compositions of sample Nos. 2, 4 and 6 of Table 1 on the adhesiveness between the surface of the biaxially oriented film treated by corona dischrge and a polymethacrylate layer coated over that film surface.

As shown in Table 2, the adhesive effect does not markedly increase even in the presence of zinc stearate at a corona discharge current intensity of 0.01 ampere/square meter/minute (Samples 2A and 2B), but it does increase in the presence of zinc stearate at current intensities of 0.02 and 0.035 ampere/square meter/minute because the corona treatment of higher intensity completely activates the film surface.

Further as shown in Table 2, the antistatic property is greatly improved (reduced half-life) by the joint use of antistatic agent and zinc stearate, with the corona disratio of 6 to 4. The coated film was dried in a hot-air circulating oven at 110° C. for one minute.

The fact that the adhesiveness between a surface of the biaxially oriented antistatic film and the copolymer layer coated over that film surface is markedly increased by the addition of zinc stearate is shown in Table 3.

Table 3

|  | Sample No. | Intensity of Corona Discharge Treatment (ampere/$m^2$/min) | Concentration of antistatic agent (wt.%) | Concentration of zinc stearate (wt.%) | Half-Life of Residual Static Electric Charge (sec)* | Scotch-Tape Test (rating) |
|---|---|---|---|---|---|---|
| Comparative | 10 | 0.035 | 1.2 | 0 | 180 | 3 |
| Examples | 11 | 0.035 | 1.6 | 0 | 110 | 3 |
| Examples | 7 | 0.035 | 1.2 | 1 | 205 | 5 |
|  | 8 | 0.035 | 1.6 | 1 | 140 | 5 |

*Indicates an antistatic property test.

GROUP III

Examples 9 and 10:

To the polypropylene resin employed in the Groups I and II tests were added (1) an antistatic agent consisting of one mole of stearyl amide reacted with 4 moles of ethylene oxide and (2) zinc stearate in the amounts shown in Table 1.

The mixture was blended by a Banbury mixer. The resultant isotactic polypropylene resin was formed into an antistatic and biaxially oriented polypropylene film by the same method as described in the Group I experiments.

The film was then printed with ink in a conventional way and was allowed to stand for 3 days in a refrigerator set at −30° C. The adhesiveness between the film surface and the ink was evaluated with the results as shown in Table 4. The printing ink used was PPNS maufactured by Toyo Ink Manufacturing Co., Ltd.

Table 4

| | Sample No. | Intensity of Corona Discharge Treatment (ampere/m²/min) | Concentration of antistatic agent (wt. %) | Concentration of Zinc Stearate (wt. %) | Half-Life of Residual Static Electric Charge (sec)* | Scotch-Tape Test (rating) |
|---|---|---|---|---|---|---|
| Comparative Examples | 13 | 0.02 | 1.2 | 0 | 83 | 3 |
| Examples | 9 | 0.02 | 1.2 | 0.6 | 138 | 5 |
| | 10 | 0.02 | 1.6 | 0.6 | 90 | 5 |

*Indicates an antistatic property test.

The results show that the adhesiveness between the film surface and the ink is rendered superior by the addition of zinc stearate is shown in Table 4.

GROUP IV

Comparative Examples

In addition to zinc stearate, there were used for tests each of the stearates of calcium, magnesium, aluminum, barium, lithium and sodium, and different films were produced, all films being antistatic and biaxially oriented in the same manner as shown in Example 6B (Table 2); that is, under the conditions of corona discharge at 0.035 ampere/square meter/-minute, an antistatic agent content of 1.6 weight percent and a metal stearate content of 1.0 weight percent.

Each of the films was coated, as described in Group I with a polymethyacrylate solution. All the films were then examined as to adhesiveness. The results showed that the film which contains zinc stearate is the higher in adhesiveness in comparison to all the others, and that zinc stearate is the most effective agent in conferring the adhesive effect on an antistatic and biaxially oriented film. The results are shown in table 5.

long-lasting antistatic property and a high adhesiveness to inks and resins, which comprises the steps of:

melt extruding a polypropylene resin composition to form a sheet, said polypropylene resin composition consisting essentially of a blend of (1) from 0.5 to 5 percent by weight of an antistatic agent for polypropylene resin, (2) from 0.2 to 3 percent by weight of a zinc salt having the formula

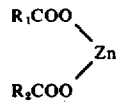

wherein $R_1$ and $R_2$ are aliphatic hydrocarbon groups having from 12 to 22 carbon atoms, and (3) the balance is crystalline polypropylene resin consisting of 90 to 100 percent by weight of propylene units in the molecule and up to 10 percent by weight of units of other monomers copolymerizable with propylene, said crystalline polypropylene resin having an intrinsic viscosity of 1.3 to 4.2 and being over 80 percent by weight insoluble in boiling n-heptane;

biaxially stretching the sheet in the longitudinal and lateral directions at a temperature below its melting point; and then subjecting the resulting film to a surface activation treatment by treating the surface of the film with corona discharge at from 0.02 to 0.05 amphere/-square meter/minute to produce polar groups on the surface of the film effective in combination with said zinc salt to cause ink or resin to adhere to Table 5

| | Metal Stearates | Sample No. | Intensity of Corona Discharge Treatment (ampere/m²/min.) | Concentration of Antistatic Agent* (wt. %) | Concentration of Metal Stearates (wt. %) | Half-Life of Residual Static Electricity (sec.) | Scotch-Tape Test (index) |
|---|---|---|---|---|---|---|---|
| Examples | Zinc Stearate | 6B | 0.035 | 1.6 | 1 | 85 | 5 |
| Comparative Examples | Calcium Stearate | 14 | 0.035 | 1.6 | 1 | 70 | 2 |
| | Magnesium Stearate | 15 | 0.035 | 1.6 | 1 | 90 | 2 |
| | Aluminum Stearate | 16 | 0.035 | 1.6 | 1 | 100 | 2 |
| | Barium Stearate | 17 | 0.035 | 1.6 | 1 | 65 | 1 |
| | Lithium Stearate | 18 | 0.035 | 1.6 | 1 | 120 | 2 |
| | Sodium Stearate | 19 | 0.035 | 1.6 | 1 | 130 | 1 |

*The antistatic agent consists of one mole of stearyl amine reacted with 6 moles of ethylene oxide.

The embodiments of the invention in which an exclusive property or privilege is claimed are defined as follows:

1. A process for preparing a biaxially stretched, crystalline polypropylene film that possesses a high and said surface so that not more than 20 percent of the ink or resin applied to said surface remains stuck to a pressure-sensitive adhesive cellophane tape after the tape is pressed onto the ink or resin on said surface and then is pulled off therefrom.

2. A biaxially stretched, crystalline polypropylene film prepared by the process of claim 1.

3. A process according to claim 1 in which the antistatic agent is nonionic.

4. A process according to claim 3 in which the antistatic agent is selected from the group consisting of a polyoxyethylene alkylamine and a polyoxyethylene alkylamide.

5. A process according to claim 1 in which the antistatic agent is the reaction product of one mole of stearyl amine with six moles of ethylene oxide, and the zinc salt is zinc stearate.

6. A process according to claim 1 in which the antistatic agent is the reaction product of one mole of stearyl amide with two moles of ethylene oxide, and the zinc salt is zinc stearate.

7. A process according to claim 1 in which the antistatic agent is the reaction product of one mole of stearyl amide with four moles of ethylene oxide, and the zinc salt is zinc stearate.

* * * * *